United States Patent Office 2,870,156
Patented Jan. 20, 1959

2,870,156

N-PYRIDYLETHYL-3,4,5 TRIMETHOXY-BENZAMIDE

Yvon Gaston Perron, De Witt, N. Y., and Joseph Sam, Camden, S. C., assignors to Bristol Laboratories Inc., East Syracuse, N. Y., a corporation of New York No Drawing. Application March 3, 1958
Serial No. 718,399

5 Claims. (Cl. 260—295)

This invention relates to certain substituted 3,4,5-trimethoxybenzamides of therapeutic value, e. g. as non-hypnotic sedatives and clinical tranquillizers and more particularly to N-(4- and 2-pyridylethyl)-3,4,5-trimethoxybenzamides and their nontoxic acid addition salts.

There is provided by the present invention a new class of compounds consisting of a member selected from the group consisting of a free base having the formula

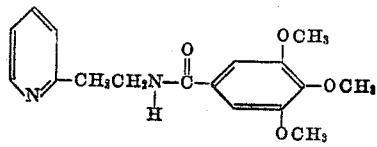

nontoxic acid addition salts thereof, a free base having the formula

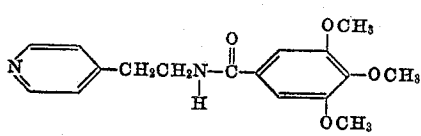

and nontoxic acid addition salts thereof.

Examples of nontoxic acid addition salts of said free bases with inorganic and organic acids, which may be prepared by the methods hereinafter disclosed, are the hydrochloride, hydrobromide, hydroiodide, sulfate, phosphate, maleate, acetate, citrate, oxalate, succinate, benzoate, tartrate, fumarate, mandelate, malate, ascorbate, 8-chlorotheophyllinate and the like.

The compounds of this invention are useful as pharmaceuticals and as pharmaceutical intermediates. More specifically, compounds of this invention are nonhypnotic sedatives and clinical tranquillizers of use in anxiety states, neuroses, emotional disturbances, insomnia, hypertension and the like. The compounds of the present invention also possess other valuable therapeutic properties as local anesthetics, analgesics and as potentiators of drugs active on the central nervous system.

These compounds produce remission in cases of severe psychoneurotic depression and severe psychotic depression and potentiate and analgesic action of morphine and codeine both in duration and degree when the compound is given by oral administration, e. g., in a daily dose of 400 to 2400 mgms. Compounds of the present invention repress the secretion of gastric acid in man and animals and markedly reduce gastric motility. Thus, use may be made by intraperitoneal injection in the Shay rat of an aqueous solution of about 5% concentration by weight in a dosage of about one-half the $LD_{50}$.

The compounds of the invention are readily prepared, for example, by reacting a 3,4,5-trimethoxybenzoyl halide, ester or azide with 4-pyridylethylamine or 2-pyridylethylamine. Treatment of the free base with one equivalent of a nontoxic acid produces the nontoxic acid addition salt.

One of the more remarkable and surprising aspects of the present invention was the discovery that the closely related compound N-[2-(5-ethyl-2-pyridyl)-ethyl]-3,4,5-trimethoxy-benzamide, M. P. 97–99° C., which has the formula

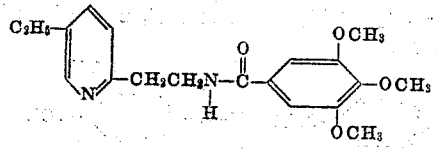

did not exhibit any of the physiological activity shown by the compounds of the present invention.

The following examples are given to illustrate the scope of the present invention without limiting it thereto.

*Example 1*

To a stirred solution of 3,4,5-trimethoxybenzoyl chloride (23 g., 0.1 mole) in 150 ml. of chloroform there was slowly added, with occasional cooling, a mixture of 4-amino-ethyl-pyridine (12.2 g. 0.1 mole), 30 ml. of triethylamine and 100 ml. chlorofrom. When the addition had been completed the resulting clear solution was refluxed for 15 minutes, cooled to room temperature, extracted with cold water and dried over anhydrous sodium sulfate. After removing the solvent by distillation under reduced pressure, the crystalline residue of N-(4-pyridylethyl)-3,4,5-trimethoxybenzamide was recrystallized several times from benzene yielding 23 g. of white crystalline product of M. P. 111–112° C.

The hydrochloride, prepared from acetone and anhydrous hydrogen chloride, melted at 151–152° C.

*Example 2*

To a solution of 13 g. (0.1 mole) of 2-pyridylethylamine and 10 g. (0.1 mole) triethylamine in 200 ml. of chloroform was added gradually with cooling a solution of 23 g. (0.1 mole) of 3,4,5-trimethoxybenzoyl chloride in 100 ml. of chloroform.

The above solution was allowed to stand at room temperature for 18 hours and then washed with water. The chloroform solution was extracted with dilute hydrochloric acid. The acid solution was neutralized with concentrated sodium hydroxide and extracted with ether. Evaporation of the ether left 18 g. of oil which solidified on cooling. Recrystallization from benzene-cyclohexane gave N-(2-pyridylethyl)-3,4,5-trimethoxy-benzamide, M. P. 122–123° C.

*Example 3*

In a 2 liter 3-necked, round bottom flask equipped with thermometer, stirrer, and dropping funnel was placed 2-(2-aminoethyl)pyridine (73.2 g., 0.6 mole), triethylamine (121.2 g., 1.2 mole), and 700 ml. chloroform. The mixture was placed in an ice bath and 3,4,5-trimethoxybenzoyl chloride (138.3 g., 0.6 mole) in 300 ml. chloroform was added dropwise. The temperature was not allowed to rise above 20° C. The reaction was stirred for 15 minutes after the addition, refluxed over the steambath for 20 minutes, and extracted four times with 200 ml. water each time. The chloroform phase was separated and dried over sodium sulfate. Removal of the solvent by distillation left the product, N-(2-pyridylethyl)-3,4,5-trimethoxybenzamide, as a solid which weighed 151 g. and melted at 123–125° C. after recrystallization from benzene.

Dry hydrogen chloride was passed into a solution of 100 g. of this free base in 700 ml. acetone to precipitate 109 g. of the hydrochloride, M. P. 189–191° C.

We claim:
1. A member selected from the group consisting of a free base having the formula

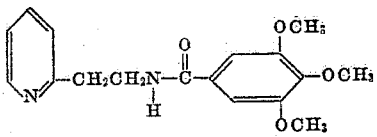

nontoxic acid addition salts thereof, a free base having the formula

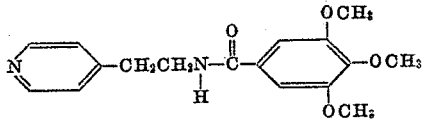

and nontoxic acid addition salts thereof.
2. A free base having the formula

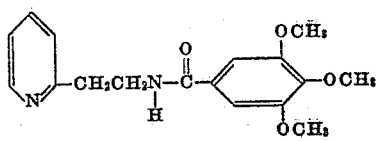

3. A free base having the formula

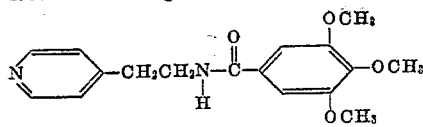

4. A nontoxic acid addition salt of a free base having the formula

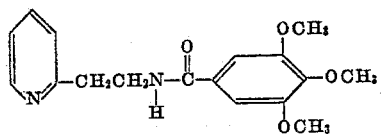

5. A nontoxic acid addition salt of a free base having the formula

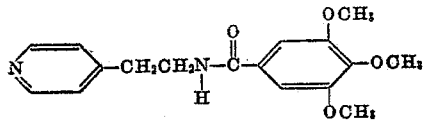

No references cited.